United States Patent
Subramanian et al.

(10) Patent No.: US 8,722,761 B2
(45) Date of Patent: May 13, 2014

(54) PLASTIC SURFACES HAVING IMPROVED SURFACE CHARACTERISTICS

(75) Inventors: Narayanan Sankara Subramanian, Hockessin, DE (US); David D. Zhang, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 576 days.

(21) Appl. No.: 12/608,472

(22) Filed: Oct. 29, 2009

(65) Prior Publication Data

US 2010/0113644 A1 May 6, 2010

Related U.S. Application Data

(63) Continuation-in-part of application No. PCT/US2009/041350, filed on Apr. 22, 2009.

(60) Provisional application No. 61/048,972, filed on Apr. 30, 2008.

(51) Int. Cl.
| | | |
|---|---|---|
| *C08K 3/08* | (2006.01) |
| *C08K 3/10* | (2006.01) |
| *C08K 3/18* | (2006.01) |
| *C08K 3/34* | (2006.01) |
| *C08K 5/24* | (2006.01) |
| *C08K 5/31* | (2006.01) |

(52) U.S. Cl.
USPC ........... 523/122; 523/207; 524/147; 524/261; 524/403; 524/407; 524/408; 524/413; 524/425; 524/430; 524/431; 524/432; 524/433; 524/439; 524/442; 524/500; 524/502; 524/537; 524/538; 524/539; 524/540; 524/542

(58) Field of Classification Search
USPC .......... 523/122, 207, 205, 223; 524/147, 261, 524/403, 407, 408, 413, 425, 431, 432, 433, 524/439, 442, 500, 502, 537, 538, 539, 540, 524/542, 406, 414, 423, 424, 492; 156/242, 156/244, 245
See application file for complete search history.

(56) References Cited

U.S. PATENT DOCUMENTS

| | | |
|---|---|---|
| 3,301,881 A | 1/1967 | Davis et al. |
| 4,479,977 A | 10/1984 | Dashiell et al. |
| 5,560,845 A | 10/1996 | Birmingham, Jr. et al. |
| 2002/0128336 A1* | 9/2002 | Kolb et al. ............ 521/50 |
| 2005/0023992 A1 | 2/2005 | Lee et al. |
| 2005/0260246 A1 | 11/2005 | Chudzik et al. |

FOREIGN PATENT DOCUMENTS

| | | |
|---|---|---|
| EP | 1712592 | 10/2006 |
| JP | 2002244338 | 8/2002 |
| WO | WO 92/03274 | 3/1992 |

OTHER PUBLICATIONS

Cox, W.P. Merz E. H Published in Journal of Polymer Science (1958) 28, pp. 619-622.
Van Frevelen, Elsevier (1990) Chapter 7, pp. 189-197.
International Search Report Apr. 8, 2009.

* cited by examiner

*Primary Examiner* — Kriellion Sanders

(57) ABSTRACT

The disclosure provides a melt processible theromoplastic composition, comprising a major proportion of a base polymer comprising a first melt processible thermoplastic polymer having a first Fedor's solubility parameter and a first viscosity; and a combination of a carrier polymer and a surface modifying additive, the carrier polymer comprising a second melt processible thermoplastic polymer which has a second Fedor's solubility parameter that is at least about 2.5 $(J/cm^3)^{1/2}$ lower than the first Fedor's solubility parameter, and a second viscosity, the carrier polymer being adhered to the surface modifying additive, and wherein the first viscosity is at least about 10 times the second viscosity.

9 Claims, No Drawings

PLASTIC SURFACES HAVING IMPROVED SURFACE CHARACTERISTICS

BACKGROUND OF THE DISCLOSURE

1. Field of the Disclosure

The present disclosure relates to plastic surfaces having improved surface characteristics and in particular to polyvinyl chloride substrates having improved surface characteristics.

2. Description of the Related Art

Polymer compositions are made into parts, such as sheets or substrates, using known techniques such as extrusion or injection molding. Polymers that are made into parts may include thermoplastic polymers such as polyvinyl chloride (PVC), acrylonitrile/butadiene/styrene (ABS) polymers, acrylic/styrene/acrylic polymers, polystyrenes, polyesters and polyamides. It would be desirable to impart properties, such as roughness, clean-ability, thermal conductivity, mold protection, mildew protection, protection from static, UV protection, etc., to these parts. Known processes for imparting properties to them include applying coatings to their surface(s). Applying a coating to the part substantially changes the dimensions of the part and adds to the cost of making said part.

A need exists for parts that have improved surface properties that are stable over time, and cost effective processes for manufacturing them. Furthermore, it is desirable that these surfaces can be produced during the manufacture of the part.

SUMMARY OF THE DISCLOSURE

In a first aspect, the disclosure provides a melt processible theromoplastic composition, comprising:

a major proportion of a base polymer comprising a first melt processible thermoplastic polymer having a first Fedor's solubility parameter and a first viscosity; and a combination of a carrier polymer and a surface modifying additive, the carrier polymer comprising a second melt processible thermoplastic polymer which has a second Fedor's solubility parameter that is at least about 2.5 $(J/cm^3)^{1/2}$ lower than the first Fedor's solubility parameter, and a second viscosity, the carrier polymer being adhered to the surface modifying additive, and wherein the first viscosity is at least about 10 times the second viscosity, more typically at least about 25 to about 50 times the second viscosity, still more typically at least about 30-50 times the second viscosity and most typically at least about 100 times the second viscosity. By 'adhered' we mean that the carrier polymer and the surface modifying additive are intimately mixed or dispersed with each other, or that the surface modifying additive is coated with the carrier polymer.

In the first aspect, the combination of carrier polymer and a surface modifying additive is made by a masterbatch process.

In the first aspect, the combination of carrier polymer and a surface modifying additive is a coated polymer. By "coated" we mean completely or partially coated. The coating may be a liquid or a solid.

In the first aspect, the combination of carrier polymer and a surface modifying additive is a physical blend.

In the first aspect, the surface modifying additive is a particle having a size up to about 15 micrometers in diameter treated with nano or pigmentary sized inorganic particles. By treated we mean partially or completely coated. The coating may be a liquid or a solid.

In a second embodiment, the disclosure provides a part, more typically a substrate, having a first surface and a second surface, wherein the part comprises a major proportion of a base polymer comprising a first melt processible thermoplastic polymer having a first Fedor's solubility parameter and a first viscosity; and wherein the first and second surfaces comprise a combination of a carrier polymer and a surface modifying additive, the carrier polymer comprising a second melt processible thermoplastic polymer that has a second Fedor's solubility parameter that is at least about 2.5 $(J/cm^3)^{1/2}$ lower than the first Fedor's solubility parameter, and a second viscosity, the carrier polymer being adhered to the surface modifying additive, and wherein the first viscosity is at least about 10 times the second viscosity, more typically at least about 25 to about 50 times the second viscosity, still more typically at least about 30-50 times the second viscosity and most typically at least about 100 times the second viscosity.

In a third aspect, the invention comprises a process for making a part having improved surface characteristics comprising:

a combination of a carrier polymer and a surface modifying additive, the carrier polymer comprising a second melt processible thermoplastic polymer that has a second Fedor's solubility parameter that is at least about 2.5 $(J/cm^3)^{1/2}$ lower than the first Fedor's solubility parameter and a second viscosity, the carrier polymer being adhered to the surface modifying additive;

processing a major proportion of a base polymer comprising a first melt processible thermoplastic polymer having a first Fedor's solubility parameter and a first viscosity, and wherein the first viscosity is at least about 10 times the second viscosity, more typically at least about 25 to about 50 times the second viscosity, still more typically at least about 30-50 times the second viscosity; and most typically at least about 100 times the second viscosity and the combination of a carrier polymer and a surface modifying additive formed in the previous step to form a part having improved surface characteristics.

The processing may comprise extrusion or injection molding.

DETAILED DESCRIPTION OF THE DISCLOSURE

The disclosure relates to a melt processible thermoplastic composition, a part, and a process for making a part having improved surface characteristics. The melt processible, theromoplastic composition comprises a major proportion of a base polymer comprising a first melt processible thermoplastic polymer having a first Fedor's solubility parameter and a first viscosity; and a combination of a carrier polymer and a surface modifying additive, the carrier polymer comprising a second melt processible thermoplastic polymer which has a second Fedor's solubility parameter that is at least about 2.5 $(J/cm^3)^{1/2}$ lower than the first Fedor's solubility parameter, and a second viscosity, the carrier polymer being adhered to the surface modifying additive, and wherein the first viscosity is at least about 10 times the second viscosity, more typically at least about 25 to about 50 times the second viscosity, still more typically at least about 30-50 times the second viscosity and most typically at least about 100 times the second viscosity. The base polymer and carrier polymers are not totally immiscible. Waxes are not considered useful as a carrier polymer or a base polymer. Further, our surface modifying additive is typically on the surface of the carrier polymer, as evidenced by the change in gloss of the surface, and it is typically preferred that the carrier polymer does not encapsulate the surface modifying agent.

Base Polymer:

The base polymer comprising a first melt processible thermoplastic polymer having a first Fedor's solubility parameter and a first viscosity.

Polymers useful in this disclosure are high molecular weight melt processable polymers. By "high molecular weight" it is meant to describe polymers having a melt index value of 0.01 to 200 g/10 min, typically from 0.5 to 100 g/10 min, and most typically from 1 to 50 g/10 min as measured by ASTM method D1238-98. The measuring condition used is dependent on the type of base polymer used. For example, polyethylene uses 190 C and 2.16 kg and for polypropylene 230 C and 2.16 kg. By "melt-processable," it is meant a polymer that can be extruded, or otherwise converted into shaped articles through a stage that involves obtaining the polymer in a molten state.

Base polymers which are suitable for use in preparing the parts of this disclosure include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate; vinyls such as polyvinyl chloride or polyvinylidene fluoride, polyvinyl esters such as polyvinyl acetate, polystyrene, acrylic homopolymers, copolymers and terpolymers including without limit polystyrene, acrylonitrile butadiene styrene terpolymer (ABS); acrylic/styrene/acrylic polymers, polyamides, phenolics; polyolefins containing elastomeric additives such as ethylene or propylene rubber, alkyds; amino resins; epoxy resins, polyamides, polyurethanes; phenoxy resins, polysulfones; polycarbonates; polysulfon, polyesters and chlorinated polyesters; polyethers; acetal resins; polyimides; and polyoxyethylenes. Mixtures of polymers are also contemplated. Typically, the base polymer may be selected from the group consisting of Polymethylmethacrylate (PMMA), polyolefin, polyvinyl chloride, polyamide, acrylonitrile butadiene styrene terpolymer (ABS), acrylic/styrene/acrylic polymers, polyamides, polyester, polyolefins containing elastomeric additives such as ethylene or propylene rubber, and mixture of these. More typically used base polymers comprise polyvinyl chloride.

The viscosity data can be obtained by capillary piston rheometer as well as by using a cone and plate viscometer. The measurement by both methods enables one to see if the Cox-Merz correlation applies to any of these polymers. The advantage of the Cox-Merz correlation is that if it is applicable, the viscosity data can be used interchangeably. Cox-Merz correlation is described in a paper by Cox, W. P, Merz E. H published in the Journal of *Polym. Sci.* 1958, 28, 619. Some polymers may degrade at the temperatures needed for the measurements and that might limit the method that can be used to measure the viscosity.

Fedor's Solubility Parameter is described in Chapter 7 "Cohesive Properties and Solubility," p 189 and Fedors' method Table 7.3, p 196). Van Krevelen, D W, *Properties of Polymers,* 3rd ed., Elsevier (1990).

The base polymer may be present in the amount of about 80 to about 99.95% by weight, more typically about 90 to about 99% by weight, based on the entire weight of the melt processible thermoplastic composition.

Other Additives

A wide variety of additives may be present in the melt processible thermoplastic compositions used to prepare the parts of this disclosure having improved surface characteristics as necessary, desirable or conventional. Such additives include polymer processing aids such as fluoropolymers, fluoroelastomers, etc., catalysts, initiators, anti-oxidants (e.g., hindered phenol such as butylated hydroxytoluene), thermal stabilizers, blowing agent, ultraviolet light stabilizers (e.g., hindered amine light stabilizers or "HALS"), organic pigments including tinctorial pigments, plasticizers, anti-blocking agents (e.g. clay, talc, calcium carbonate, silica, silicone oil, and the like) leveling agents, flame retardants, anti-cratering additives, antistatic, slip additives and the like.

Carrier Polymer:

The carrier polymer is a second melt processible thermoplastic polymer that is not totally compatible with the base polymer. By "not totally compatible" we mean Fedor's solubility parameter differences of greater than at least about 2.5 $(J/cm^3)^{1/2}$.

The second melt processible thermoplastic polymer has a second Fedor's solubility parameter that is at least about 2.5 $(J/cm^3)^{1/2}$ lower than the first Fedor's solubility parameter, more typically, about 3 $(J/cm^3)^{1/2}$ lower than the first Fedor's solubility parameter. The first viscosity (base polymer) is at least about 10 times the second viscosity (carrier polymer), more typically at least about 25 to about 50 times the second viscosity, still more typically at least about 30-50 times the second viscosity and most typically at least about 100 times the second viscosity.

By 'adhered' we mean that the carrier polymer and the surface modifying additive are intimately mixed or dispersed with each other, or that the surface modifying additive is coated with the carrier polymer. Some suitable carrier polymers include ethylene vinyl acetate copolymers, acrylate copolymers, polyethylene, polypropylene and their copolymers as well as homo and co-polymers of tetrafluoroethylene.

The viscosity data can be obtained by capillary piston rheometer as well as by using a cone and plate viscometer. The measurements by both methods enables one to see if the Cox-Merz correlation applies to any of these polymers. The advantage of the Cox-Merz correlation is that if it is applicable, the viscosity data can be used interchangeably. Cox-Merz correlation is described in a paper by Cox, W. P, Merz E. H published in the Journal of *Polym. Sci.* 1958, 28, 619. Some polymers may degrade at the temperatures needed for the measurements and that might limit the method that can be used to measure the viscosity. Typically base polymer and carrier polymer viscosity are measured by the same technique (e.g. piston rheometer)

Fedor's Solubility Parameter is described in Chapter 7 "Cohesive Properties and Solubility," p 189 and Fedors' method Table 7.3, p 196). Van Krevelen, D W, *Properties of Polymers,* 3rd ed., Elsevier (1990).

The carrier polymer may be present in the amount of about 0.05 to about 20% by weight, more typically about 0.5 to about 15% by weight, based on the entire weight of the combination.

Surface Modifying Additive:

The surface modifying additive may be a solid or a liquid. The surface modifying agent may be a solid selected from the group consisting of silicates; metal oxides; calcium carbonate; barium sulfate; elemental metal powders such as iron, titanium, copper; and silicas such as fumed silica, and mixtures thereof. Representative examples of oxides include oxides of titanium, magnesium, calcium, barium, strontium, zinc, tin, nickel, silicon, iron, and fumed silica. Other metal oxides include oxides of selenium, tungsten, ruthenium, tin, tantalum, silver, iridium, molybdenum, niobium, indium, cadmium, hafnium, zirconium, manganese, copper (I), vanadium, chromium (VI), yttrium, germanium, and mixed oxides, such as aluminosilicate and $Ti_xZr_{1-x}O_2$ wherein x is between 0 and 1.

Typically the inorganic particles may be pigmentary or nano-sized and have a particle size diameter of about 0.02 μm to about 50 μm, more typically from about 0.1 μm to about 25 μm and most preferably from about 0.5 μm to about 10 μm. Suitable particles can have a diameter of less than about 500 nm or may be formed from agglomerates of primary particles having a size from about 2 to about 1000 nm. Alternately, the inorganic particle may comprise a pigmentary particle treated with nano-sized particles. By treated we mean the pigmentary particles may be partially or completely coated with the nano-sized particles.

The inorganic particles may be hydrophobically treated with organic surface treatment materials having a low surface energy versus the base polymer that include, but are not limited to, for example, organo-silanes; organo-siloxanes; fluoro-silanes; organo-phosphonates; organo-phosphoric acid compounds such as organo-acid phosphates, organo-pyrophosphates, organo-polyphosphates, and organo-metaphosphates; organo-phosphinates; organo-sulfonic compounds; hydrocarbon-based carboxylic acids and associated derivatives and polymers; hydrocarbon-based amides; alkanolamines and derivatives thereof; and commonly utilized organic dispersing agents; all the above utilized either individually or as mixtures, applied in concert or sequentially. Low molecular weight hydrocarbon waxes as additives have been found to be ineffective.

Suitable organo-silanes for use in the practice of this disclosure include silanes disclosed in U.S. Pat. No. 5,560,845 issued to Birmingham, Jr. et al. on Oct. 1, 1996, having the general formula $$Si(R^1)(R^2)(R^3)(R^4) \quad (I)$$

in which at least one R is a non-hydrolyzable organic group, such as alkyl, cycloalkyl, aryl, or aralkyl, having 1-20 carbon atoms, typically 4-20 carbon atoms, most typically 6-20 carbon atoms, and at least one R is a hydrolyzable group such as alkoxy, halogen, acetoxy, or hydroxy. The other two R are, independently, hydrolyzable or non-hydrolyzable as above. It is typical that at least two, and especially that three, of the R are hydrolyzable. The non-hydrolyzable R can be fully or partially fluorine substituted. A silane having the foregoing description is herein called "organo-silane" in reference to the non-hydrolyzable R group(s). Organo-silanes may be linear or branched, substituted or unsubstituted, and saturated or unsaturated. Typically, non-hydrolyzable R groups are non-reactive. Alkyl, cycloalkyl, aryl, and aralkyl are typical non-hydrolyzable R, with alkyl being most typical, including the possibility of any of these groups being fully or partially fluorine substituted. When the hydrolyzable R is identical, the organo-silane can be represented by $$R^5_x SiR^6_{4-x} \quad (II)$$

wherein $R^5$ is non-hydrolyzable and $R^6$ is hydrolyzable as defined above and x=1-3. Typically $R^6$ include methoxy, ethoxy, chloro, and hydroxy. Ethoxy is especially typical for ease of handling. Some typical organo-silanes include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Mixtures of organo-silanes can be used.

In embodiments utilizing organo-silanes represented by Formula II, preferred silanes are $R^5$=8-18 carbon atoms; $R^6$=ethoxy; and x=1 to 3. The $R^5$=8-18 carbon atoms are preferred, for example for enhanced processibility. $R^6$=ethoxy is preferred for ease of handling. Most typical is octyltriethoxysilane. Some other examples of hydrophobic surface treatment materials are described in detail in US2005/023992 published Oct. 27, 2005. More typically the hydrophobically treated inorganic particles include hydrophobically treated fumed silica available commercially under the product designation Aeroxide® LE1 (sold by Degussa Evonik, Parsippany, N.J.) and titanium dioxide available commercially under the product designation R-104 (sold by E. I. du Pont de Nemours and Company, Wilmington, Del.).

The surface modifying additive may also include carbonates, sulfates, titanates, arsenides, sulfides, selenides, phosphides and combinations of two or more thereof. Representative examples of carbonates and sulfates are carbonates and sulfates of calcium, barium, and strontium. Representative of titanates are titanates of barium, strontium, and calcium. The particles may be pigmentary or nano-sized particles.

Inorganic and/or organic colored pigments for visual and aesthetic effects may also be useful. These pigments are commercially available materials well known to those skilled in the art. Examples of such pigments include various colored inorganic metal oxides such as Cobalt Chromites, Cobalt Titanates, Cobalt Phosphates, Bismuth Vanadates and the like commercially available from Shepherd Color Company, Cincinnati, Ohio. Inorganic white pigments such as titanium dioxide (commercially available from E.I. du Pont de Nemours and Company, Wilmington, Del.) can be employed. Also colored organic pigments such as copper phthalocyanine and quinacridone pigments may be added to add color and visual effects to the surfaces.

Biocides may be used as the surface modifying agent to protect the part from mold and mildew. Some suitable examples of biocides include silver based inorganic or organic additives, OBPA (10,10-oxybisphenoxarsine), IPBC (3-iodo-2-propynyl butyl carbamate), inorganic oxides such as zinc oxide and titanium dioxide, etc.

For self cleaning surfaces, liquid surface modifying additives such as fluorochemicals and lecithin may be useful. The fluorochemicals include various perfluoroalkyl esters, fluorinated urethanes, fluorinated acrylic or methacrylic copolymers, fluorinated anionic surfactants, fluorinated sulfonamides, and fluorinated diols. Many such fluorochemicals are commercially available; the preferred distributor for fluorochemicals for use with this invention is E.I. du Pont de Nemours and Company, Wilmington, Del. Some examples or useful fluorochemicals include Zonyl® fluorochemicals such as FS-610, 8867-L-LX. The lecithin additive may be acylated, most typically the lecithin additive is acetylated. A more detailed description of the production of acylated lecithin can be found in U.S. Pat. Nos. 3,301,881 and 4,479,977, specifically hereby incorporated by reference.

For imparting antistatic property, surface modifying additives such as carbon black, potassium ionomer from DuPont, Irgastat from Ciba Corporation etc., may be useful. Other additives that may improve the surface characteristics of a finished product, such as a part, are also considered within the scope of this disclosure.

The surface modifying additive may be present in the amount of about 0.05 to about 20% by weight, more typically about 0.5 to about 15% by weight, based on the entire weight of the combination.

Preparation of the Part:

The base polymer, the combination of carrier polymer and surface modifying additive, together with any additives, can be formed into any suitable shaped article of manufacture such as a film, container, bottle, tube, sheet/plate/profile, industrial or consumer part. Especially suitable articles are those that may be exposed to dirt and grime such as exterior architectural building materials or parts including without limit, window casings, exterior siding, containers for products including consumer products (e.g. personal care products or residential cleaning products) or industrial products (e.g. industrial cleaning products) and the like. The combination of carrier polymer and surface modifying additive may be made by a masterbatch process. Masterbatch is a concentrated mixture of pigments and/or additives encapsulated during a heat process into a carrier polymer which is then cooled and cut into a granular shape. A masterbatch process is the incorporation or dispersion of such pigments and/or additive into a polymer and can be carried out using a twin screw extruder or other polymer processing equipment. Selection of the screw design and other details on ways to prepare a masterbatch to obtain the best dispersion can be found in "Masterbatch production on co-rotating twin screw extruders" on page 36 in the March/April 2007 issue of "Plastics Additives and Compounding". Alternately, the combination of carrier polymer and surface modifying additive may be a physical blend or coated polymer wherein the coating may be a solid or a liquid.

The process for making a part having improved surface characteristics comprises:

forming a combination of a carrier polymer and a surface modifying additive, the carrier polymer comprising a second melt processible thermoplastic polymer that has a second Fedor's solubility parameter that is at least about 2.5 $(J/cm^3)^{1/2}$ lower than the first Fedor's solubility parameter and a second viscosity, the carrier polymer being adhered to the surface modifying additive;

processing a major proportion of a base polymer comprising a first melt processible thermoplastic polymer having a first Fedor's solubility parameter and a first viscosity, and wherein the first viscosity is at least about 10 times the second viscosity, more typically at least about 25 to about 50 times the second viscosity, still more typically at least about 30-50 times the second viscosity and most typically at least about 100 times the second viscosity; and the combination of a carrier polymer and a surface modifying additive formed in the previous step to form a part having improved surface characteristics. The processing may comprise extrusion or injection molding.

EXAMPLES

Tests

Cleanability Procedure 1 (PVC 1 from Polyone was used to make parts and tested using this procedure)

The extruded samples were tested for dirt pick up resistance (DPR). Extruded samples of the part were cut to a size of 1.5"×2" and mounted on a 4"×6" metal panel. The panel that held the samples was then inserted into a 45 degree angle slot cut in a wooden block. The panels were placed in the bottom of a 3 gallon pail to help contain the dust. The dust composition consisted of:
62 g. Dry Artificial Dirt Batch:

| | |
|---|---|
| 19.35% | 12 g. Silica Gel |
| 19.35% | 12 g. Aluminum Oxide |
| 9.68% | 6 g. Iron Oxide - (Black) |
| 1.61% | 1 g. Lamp Black powder |
| 50.00% | 31 g. Local dried soil (pulverized with mortar and pestle) |

Dust Applicator:

The applicator was constructed by cutting a ½" diameter hole in the top of a scintillation vial cap. Two 45 mesh screens were cut and inserted inside the vial cap. The vial was filled in a chemical hood approximately ⅓ full with the dust. Dust was applied to the samples by shaking the vial above the samples as one would a salt or pepper shaker.

When the panels were completely covered with dust, the application process was complete. The excess dust was removed by lightly tapping the mounted panel on the wooden block inside the plastic 3 gallon bucket.

The 4"×6" panel which held the dusted samples was then placed on a Vortex-Genie2 (supplying a vibration source) for 30 seconds to remove any remaining dust. The panel was then tapped on the hood table top to dislodge any dust, and then vibrated again for 30 seconds to assure all loose dust had been removed. One final 10 second vibration was done above a clean C-fold paper towel to verify that all the dust has been removed. The panels were read to determine the L*a*b* values with a Hunter Lab Scan and graphed to demonstrate the paint panels DPR attributes.

Weatherometer Exposure:

The samples were placed in a Weather-Ometer (Atlas Ci 5000, Xenon Weather-Ometer, Chicago, Ill.) for a 24 hour exposure, using ASTM G155-1 test procedure which incorporated UV light, high temperature and simulated rain.

The clean panels were then read using LabScan Manufactured by HunterLab, Reston, Va., to determine their L*a*b* values and graphed.

DPR=10×(1−($L^*_{si}$−$L^*_{ss}$)/($L^*_{ci}$−$L^*_{cs}$)), wherein $L^*_{ss}$ is the L* reading of the soiled treated sample of the disclosure;
$L^*_{si}$ is the L* reading of the treated sample before soiling;
$L^*_{cs}$ is the L* reading of the untreated soiled sample (control); and
$L^*_{ci}$ is the L* reading of the untreated sample before soiling (control).

Cleanability Procedure 2:

Cleanability Procedure 1 was repeated with the following exceptions: PVC 2 from CCC Plastics was used to make parts and tested using this procedure.
The Dust Composition Consisted of:
62 g. Dry Artificial Dirt Batch

| | |
|---|---|
| 38.71% | 24 g Silica Gel |
| 38.71% | 24 g Aluminum oxide powder |
| 19.36% | 12 g Iron Oxide - (Black) |
| 3.22% | 2 g Lamp Black powder |

After combining the above ingredients the mixture was placed on a roller mill for 48 hours for thorough mixing. This mixture was stored in a desiccator to avoid moisture accumulation.

Dust Applicator:

The new applicator was constructed by cutting a ½" diameter hole in the top of a scintillation vial cap. A 45 mesh screen was cut and inserted inside the vial cap. The vial was filled approximately ⅓ full with the dust.

Test Coupon Exposure to Dry Dusting:

PVC test strips were cut to a size of 1.5"×2" and taped onto a 4"×6" metal panel. Replicates were made for each treatment as needed. The 4"×6" panel that held the replicates was then inserted into a 45 degree angle slot cut in a wooden block. The panels were placed in the bottom of a shallow tray to help contain and collect the dust for reuse. (Application was conducted in a chemical hood to contain airborne dust). The dust applicator dispensed the dust by shaking the vial above the panels as one would shake a salt or pepper shaker. When the panels were completely covered with dust, the application process was complete.

Removing Excess Dust from Coupons:

The excess dust was removed by lightly tapping the mounted coupons 5 times on the wooden block inside the shallow tray. The excess dust was collected and reused. The 4"×6" panel which held the dusted panels was then clamped onto a Vortex-Genie2, (Scientific Industries, 70 Orville Drive, Bohemia, N.Y. 11716 USA, supplying a vibration source) for 30 second at the highest setting to remove any remaining dust. The panel was then removed and tapped 10 times on the hood table top to dislodge any dust, and was then clamped and vibrated again for 30 seconds to assure all loose dust had been removed.

The replicated coupons were read to determine the L*a*b* values with a Hunter Lab Scan, averaged and graphed to demonstrate the new DPR attributes. New DPR was calculated by subtracting L* soot from L* initial. The Weatherometer test and the calculation of the new Dirt Pick-up resistance were carried out using the following procedure.

Following the dirt applications as described above, the sooted coupons which were on a panel were placed in an Atlas Ci5000 Xenon Weather-O-meter (WOM-(Atlas Material Testing Technology 4114 North Ravenswood Avenue, Chicago, Ill. 60613, USA) according to ASTM D2565 procedure for a 24 hour exposure. The Weather-O-meter incorporates UV light, high temperature and simulated rain.).

The Environmentally exposed (WOM) coupon replicates were then read, and averaged to determine their L*a*b* values and graphed. The environmental cleanability was calculated as shown below.

The coupons that were removed from the WOM were now scrubbed with a Scrub Machine using a back and forth motion of 4 cycles. Cheese cloth was attached to the scrub head and 10 ml of 1% Joy solution were used as the cleaning solution. L* was measured again. The difference between this L* and L* initial was defined as the Forced Cleanability as shown below. Other cleanability parameters were calculated similarly. The term "Weathered" used below means pre exposing the samples in the WOM for a specific duration and testing the samples using the procedure for applying soot etc., The new Dirt pick up resistance was measured following the cleanability procedure 2 as described above.

NDPR(New Dirt Pick Up Resistance)=$L^*$ initial–$L^*$ sooted

Environmental Cleanability=$L^*$ initial–$L^*$ WOM after exposure for 24 hours (ASTM D2565)

Forced Cleanability=$L^*$ initial–$L^*$ scrubbed

Weathered NDPR=($L^*$ initial–$L^*$ sooted) after pre-determined hours of exposure in WOM Weathered Environmental Cleanability=($L^*$ initial–$L^*$ WOM 24) after pre-determined hours of exposure in a WOM Weathered Forced Cleanability=($L^*$ initial–$L^*$ scrubbed) after pre-determined hours of exposure in a WOM

GLOSSARY

PVC1 is Polyvinyl Chloride-Extrusion Grade, Polyone Corporation, Cleveland, Ohio PVC 2 is Polyvinyl Chloride, CCC Plastics, Don Mills, Ontario, Canada Elvaloy® 741 is Ethylene Vinylacetate Carbon monoxide terpolymer from DuPont Company, Wilmington, Del.

Elvax® 3180 is Ethylene Vinylacetate copolymer from DuPont Company, Wilmington, Del.

Elvaloy®15024 AC is Ethylene Methylacrylate copolymer from DuPont Company, Wilmington, Del.

TFE/VF/PFBE is a Laboratory made sample of a terpolymer of Tetrafluoroethylene (57 wt %), Vinylfluoride (35 wt %), Perfluorobutylethylene (8 wt %) from DuPont Company, Wilmington, Del.

Zonyl® FS-610 is a Fluorophosphate additive from DuPont Company, Wilmington, Del.

Teflon® Micro-powders MP-1100, MP-1200 and MP-1300 are sold by DuPont Company, Wilmington, Del.

R-350 and R-105 are pigmentary $TiO_2$ from DuPont Company, Wilmington, Del.

Zinc oxide is an inorganic powder imported by Umicore Marketing Services, Raleigh, N.C.

ABS is Acrylic Butadiene Styrene-Magnum® 700 from Dow Chemical Corporation, Midland, Mich.

ASA-Acrylic Styrene Acrylic-Luran® S757 from BASF Corporation, Florham Park, N.J.

Aeroxide®LE1 is nano Silicon dioxide from Degussa Evonik Corporation, Parsippany, N.J.

Polypropylene 7825 is from Total Corporation, Deer Park, Tex.

PDMS is Polydimethyl siloxane 200 from Dow Corning, Midland, Mich.

Viscosity Measurement of PVC and Other Carrier Polymers:

Viscosity of the various polymers used in the cleanability experiments was measured using a rotational rheometer as well as by using a piston rheometer at different temperatures. The viscosity ratios were calculated at the same temperature and shear rate (190 C and $8^{(-1)}$) seconds.

The complex viscosity was measured in accordance with ASTM D 4440 using a TA Instruments ARES LS2 controlled strain rotational rheometer equipped with 25 mm parallel plates and a forced flow convection oven.

The capillary viscosity was measured in accordance with ASTM D 3835 using a Dynisco LCR 7002 capillary rheometer.

Sample Preparation

The carrier polymer samples were compression molded into plaques prior to testing on the rotational rheometer. The plaques were molded using a chase mold at 160° C. with approximately 1 ton of force supplied by a Dake Model 944605 heated laboratory press. 25 mm diameter discs were punched out of the plaques.

The apparent viscosity of the different carrier polymers was measured at 160, 170, 180, and 190° C. and at shear rates from 1-1000 $s^{-1}$ using a 1.0 mm (0.0394 in) diameter die with L/D=30 and a 180 degree inlet angle. The complex viscosity and the piston rheometer viscosity data for Polypropylene overlay indicating that the Cox-Merz rule holds for this sample. For other carrier polymers which we tested, the above rule does not apply.

The viscosity of the carrier polymers at 190° C. and a shear rate of 8 $s^{-1}$ obtained using a capillary rheometer is shown below. As can be seen the viscosity of PVC samples may be different depending upon the molecular weight of the PVC and other additives to prevent it from degradation.

TABLE 1

Ratios of viscosity of carrier polymers (listed on the left most column) to PVC 1 and PVC 2

| Sample | Viscosity (pa · S) | Ratio of PVC 1 to Carrier Polymer | Ratio of PVC 2 to Carrier Polymer |
|---|---|---|---|
| Elvaloy 741$^R$ | 340 | 27.65 | 50.00 |
| Elvaloy 15024$^R$ | 200 | 47 | 85.00 |
| Elvax$^R$ 3180 | 390 | 24.10 | 43.59 |
| Polypropylene 7825 | 700 | 13.43 | 24.29 |
| PVC1-powder | 9400 | 1 | NA |
| PVC2-powder | 17000 | NA | 1 |

Sample Preparation:

Combinations of Additive and carrier polymer and their method of preparation are shown in Table 2 below:

TABLE 2

Combination of Carrier Polymers, additives and their method of preparation

| Samples | Additives Type/Level wt % | Method of Preparation | Equipment | T Deg C./ RPM | Carrier Polymer |
|---|---|---|---|---|---|
| Sample 1 | ZnO/28% | Master Batch | W&P T/S Extruder | 220 C./150 | Elvaloy ® 741 |
| Sample 2 | Aeroxide ® LE1/~20% | Master batch | W&P T/S Extruder | 220 C./150 | Elvaloy ® 741 |
| Sample 3 | TiO2/50% | Master Batch | W&P T/S Extruder | 220 C./150 | Elvaloy ® 741 |
| Sample 4 | Aeroxide ® LE1/25% | Master Batch | W&P T/S Extruder | 220 C./150 | Polypropylene 7825 |
| Sample 5 | ZnO/28% | Master Batch | W&P T/S Extruder | 220 C./150 | Polypropylene 7825 |
| Sample 6 | Teflon ® MP-1300/50% | Master Batch | W&P T/S Extruder | 220 C./150 | Polypropylene 7825 |
| Sample 7 | TiO2 R-350/50% | Master Batch | W&P T/S Extruder | 220 C./150 | Polypropylene 7825 |
| Sample 8 | TiO2 R-105/50% | Master Batch | W&P T/S Extruder | 220 C./150 | Elvax ® 3180 |
| Sample 9 | Teflon ® MP-1300 (50%) | Master Batch | W&P T/S Extruder | 220 C./150 | Elvaloy ® 15024 |
| Sample 10 | TFE Copolymer, 57% TFE/35% VF/8% PFBE | Coated with PDMS/Physical blend | None | Room Temp. | None |
| Sample 11 | Zonyl ® FS 610-16X (1%) | Physical Blend with PVC | None | Room Temp. | None |
| Sample 12 | Zonyl ® FS 610-16X (0.5%) | Physical Blend with PVC | None | Room Temp. | None |
| Sample 13 | Teflon ® MP-1200 (5%) | Physical blend with PVC | None | Room Temp. | None |
| Sample 14 | Teflon ® MP-1100 (5%) | Physical blend with PVC | None | Room Temp. | None |
| Sample 15 | Teflon ® MP-1300, coated with LE-1(4.3%) | Solid-solid coating | Hybridizer for solid-solid coating | Room Temp. | None |
| Sample 16 | Teflon ® MP-1300 coated with TiO$_2$(7.6%) | Solid-solid coating | Hybridizer for solid-solid coating | Room Temp. Room Temp. | None |
| Sample 17 | Teflon ® MP-1300, coated with Aeroxide ® LE-1 (4.3%) | Solid-solid coating | Hybridizer for solid-solid coating | Room Temp. | PDMS |
| Sample 18 | Teflon ® MP-1300 coated with TiO$_2$(7.6%) | Solid-solid coating | Hybridizer for solid-solid coating | Room Temp. | PDMS |

Examples 1-14 and Comparative Examples 1-4

Base polymer identified in Table 3 and Samples 1-2 and 4-8 and 10 were extruded using a small laboratory scale co-rotating Haake Rheomex TW-100 twin screw extruder (Haake Buchler Instruments Inc, Saddle brook, N.J.) attached to a drive made by CW Brabender, (Hackensack, N.J.), with two conical screws under the conditions outlined in Table 3. Base polymers identified in Table 3 and Samples 3, 9 and 11-14 were injection molded into parts (4 "diameter by 0.125" thick disc) on a 10.5 oz Nissei FN 4000 injection molding machine at molding temperature at 225° C. and under the conditions outlined in Table 3.

TABLE 3

Results and Examples of Extrusion/Injection Molding Runs

| | Weight % of the additives | Sample # used (from Table 2) | Base [2] (BP) and Carrier Polymers (CP) | Calculated Solubility Parameter [1] Difference (J/cm3)^½ | Temp Deg C./RPM | DPR |
|---|---|---|---|---|---|---|
| Comparative Examples | | | | | | |
| Control Sample, Example 1 | 0 | — | PVC/None | 0 | 190 C./50 | 0 |
| Example 2 | 20 | 1 | PVC/Elvaloy ® 741 | 2.3 | 190 C./50 | 0.08 |
| Example 3 | 20 | 2 | PVC/Elvaloy ® 741 | 2.3 | 190 C./50 | −0.3 |
| Example 4 | 20 | 3 | ABS Magnum 700/ Elvaloy ® 741 | 2.3 | 225 C. | 0.6 |
| Examples | | | | | | |
| Example 1 | 20 | 4 | PVC/PP 7825 | 4.6 | 190 C./50 | 4.6 |
| Example 2 | 20 | 5 | PVC/PP 7825 | 4.6 | 190 C./50 | 4 |
| Example 3 | 7.5 | 6 | PVC/PP 7825 | 4.6 | 190 C./50 | 4.5 |
| Example 4 | 7.5 | 7 | PVC/PP 7825 | 4.6 | 190 C./50 | 4 |
| Example 5 | 7.5 | 8 | PVC/Elvax ® 3180 | 3.8 | 190 C./50 | 2.34 |
| Example 6 | 5 | 10 | PVC blend with Teflon ® Co-polymer- NO CP | 8.3**** | 190 C./50 | 2.24 |
| Example 7 | 1 | 11 | PVC coated with Zonyl ® FS-610-NO CP | >2.5 | 190 C./50 | 4.04 |
| Example 8 | 0.5 | 12 | PVC coated with Zonyl ® FS-610-NO CP | >2.5 | 190 C./50 | 4.35 |
| Example 9 | 5 | 13 | PVC with Teflon ®- NO CP | 8.3**** | 190 C./50 | 2.73 |
| Example 10 | 5 | 14 | PVC with Teflon ®- NO CP | 8.3**** | 190 C./50 | 2.02 |
| Example 11 | 20 | 7 | ABS Magnum ® 700/PP 7825 | 4.6***** | 220 C. | 3.4 |
| Example 12 | 20 | 6 | ABS Magnum ® 700/PP 7825 | 4.6***** | 220 C. | 3 |
| Example 13 | 20 | 9 | ABS Magnum ® 700/Elvaloy ® 15024 AC | 4.6***** | 220 C. | 2.8 |
| Example 14 | 8 | 9 | Luran ® S 757/Elvaloy ® 15024AC | 4.6***** | 240 C. | 1.9 |

Comparative Examples 1-3 and Examples 1-10 used Haake Rheomex TW-100 Laboratory Scale Twin Screw Extruder
Comparative Example 4 and Examples 11-14 used Nisssei FN 4000 Injection molding machine
[1] Solubility parameters were calculated using Fedor's method
[2] All PVC Base Polymers contain 5 wt % of R-105 TiO2
ABS Viscosity was measured at 200 C. and Luran at 220 C. by Piston rheometer
****Difference between Teflon ® Polymer and PVC, copolymers will be about a unit less, 7.3
*****The Calculated solubility parameter for ABS and ASA are about the same as PVC As can be seen from the Dirt Pick-up Resistance data in Table 3 (DPR) the DPR values for comparative examples are higher than the values for the Examples in 1-4 which uses a compatible polymer Elvaloy® 741, whereas the comparative example polymers are incompatible. Higher DPR values indicate that these samples would have self cleaning to easy cleaning characteristics.

Examples 15-18

Base polymer, polyvinyl chloride and Samples 15-18 are extruded as described in the above examples.

It is expected that DPR for these samples would be higher than the control sample.

Examples 19-21

Table 4 describes the results of the analysis of samples made with PVC 2 and additives as shown below. These samples were tested for easy clean properties as "as is" and after weathering them for 500 hours in the Weatherometer. As can be seen from these results, the samples after weathering for 500 hours have better easy clean properties as shown by the lower values of NDPR when measured "as is" and after weathering.

Example 19 in Table 4 below is a comparative example where no additives were added to the PVC 2 blended with R-105 TiO$_2$. The test coupons were tested in duplicate using the cleanability procedure 2. Example 20 used sample 5 (from Table 2) as an additive with the PVC 2/R-105 blend. Example 21 used sample 4 from Table 2 as an additive with PVC 2 and R-105 blend. The extruded samples in Table 4 were made on a Wayne Line extruder. The sheets were cast using a 31.75 mm diameter 30/1 L/D single screw extruder fitted with a 3/1 compression ratio, single-flight screw with 5 L/D of a melt mixing section. There was no breaker plate between extruder barrel and die adapter. The extruder die was a 203-mm wide coat hanger type flat film die with a 0.76 mm die gap. The extruder was built by Wayne Machine (100 Furler St. Totowa N.J. 07512-1896). The molten polymer film exiting from the die drawn down to nominally 0.76 mm thick as it was cast onto a 203-mm wide by 203-mm diameter double-shell spiral baffle casting roll fitted with controlled temperature cooling water. The casting roll and die were built by Killion Extruders (Davis Standard, 200 Commerce Road, Cedar Grove, N.J. 07009). The temperature set points for extruder was 190 C and the screw was run at 85 rpm.

TABLE 4

| | L* Initial | L* sooted | L*washed in WOM | NDPR (L*Initial − L*Sooted) | Environmental Cleanability | L* initial after 500 hrs | L* Sooted after 500 hrs | L* washed in WOM 24 hrs | Weathered NDPR | Weathered Environmental Cleanability |
|---|---|---|---|---|---|---|---|---|---|---|
| Comparative | 96.87 | 90.6 | 95 | 6.27 | 1.87 | 96.33 | 87.56 | 94.66 | 8.77 | 1.67 |
| Example 19 | 96.62 | 90.03 | 95.21 | 6.59 | 1.41 | 96.29 | 88.94 | 95.38 | 7.35 | 0.91 |
| Example 20, | 95.46 | 88.16 | 92.76 | 7.3 | 2.7 | 95.97 | 90.1 | 94.48 | 5.87 | 1.49 |
| Sample 5 | 95.25 | 89.88 | 93.62 | 5.37 | 1.63 | 95.98 | 90.24 | 94.5 | 5.74 | 1.48 |
| Example 21, | 97.38 | 92.36 | 95.1 | 5.02 | 2.28 | 96.67 | 94.91 | 96.38 | 1.76 | 0.29 |
| Sample 4 | 97.3 | 91.99 | 94.73 | 5.31 | 2.57 | 96.76 | 94.8 | 96.41 | 1.96 | 0.35 |

What is claimed is:

1. A melt processible thermoplastic composition, comprising:
a major proportion of a base polymer comprising a first meltprocessible thermoplastic polymer having a first Fedor's solubility parameter and a first viscosity; and
a combination of a carrier polymer and a surface modifying additive, the carrier polymer comprising a second melt processible thermoplastic polymer which has a second solubility parameter that is at least 2.5 $(J/cm_3)_{1/2}$ lower than the first solubility parameter, and a second viscosity, the carrier polymer being adhered to the surface modifying additive, and
wherein the first viscosity is at least 25 times the second viscosity, as measured by a Cone and Plate viscometer at 190° C., at 6.283 rad s'$_1$ and at 500 s; and
wherein the base polymer is polyvinyl chloride.

2. The composition of claim 1 wherein the base polymer is present in the amount of 80 to 99.95% by weight, based on the entire weight of the melt processible thermoplastic composition.

3. The composition of claim 1 wherein the carrier polymer is selected from the group consisting of ethylene vinyl acetate copolymers; acrylate copolymers; polyethylene; polypropylene and their copolymers; and homo and co-polymers of tetrafluoroethylene.

4. The composition of claim 1 wherein the carrier polymer is present in the amount of 0.05 to 20% by weight, based on the entire weight of the combination.

5. The composition of claim 1 wherein the surface modifying additive is a solid selected from the group consisting of silicates; metal oxides; calcium carbonate; barium sulfate; elemental metal powders; silicas and mixtures thereof.

6. The composition of claim 5 wherein the metal oxides are selected from the group consisting of oxides of titanium, magnesium, calcium, barium, strontium, zinc, tin, nickel, silicon, and iron, selenium, tungsten, ruthenium, tantalum, silver, iridium, molybdenum, niobium, indium, cadmium, hafnium, zirconium, manganese, copper (I), vanadium, chromium (VI), yttrium, and germanium, fumed silica and mixed oxides aluminosilicate and $Ti_xZri_xO2$ wherein x is between 0 and 1.

7. The composition of claim 1 wherein the surface modifying additive has a particle size diameter of 0.02 u.m to 50 um.

8. The composition of claim 1 wherein the surface modifying additive is selected from carbonates, sulfates, titanates, arsenides, sulfides, selenides, phosphides and combinations of two or more thereof; is selected from an inorganic pigment, an organic colored pigment, and mixtures thereof; is a biocide; is selected from fluorochemicais, lecithin and mixtures thereof; or is carbon black, or a potassium ionomer.

9. The composition of claim 1 wherein the surface modifying additive may be present in the amount of 0.05 to 20% by weight, based on the entire weight of the composition.

* * * * *